United States Patent
Bhageria et al.

(10) Patent No.: US 8,674,843 B2
(45) Date of Patent: Mar. 18, 2014

(54) SYSTEM AND METHOD FOR DETECTING AND LOCALIZING ABNORMAL CONDITIONS AND ELECTRICAL FAULTS IN AN ELECTRICAL GRID

(75) Inventors: Gopal K. Bhageria, Overland Park, KS (US); Sandeep R. Patil, Elmsford, NY (US); Sri Ramanathan, Lutz, FL (US); Jean-Gael F. Reboul, Kenmore, WA (US); Matthew A. Terry, Dunwoody, GA (US); Matthew B. Trevathan, Kennesaw, GA (US)

(73) Assignee: International Business Machines Corporation, Armonk, NY (US)

(*) Notice: Subject to any disclaimer, the term of this patent is extended or adjusted under 35 U.S.C. 154(b) by 251 days.

(21) Appl. No.: 13/231,782

(22) Filed: Sep. 13, 2011

(65) Prior Publication Data
US 2013/0063272 A1  Mar. 14, 2013

(51) Int. Cl.
*G08B 21/00* (2006.01)

(52) U.S. Cl.
USPC .............................. 340/635; 700/286; 702/58

(58) Field of Classification Search
USPC ......... 340/901, 902, 905, 907, 916, 927, 933, 340/635, 649–664; 700/286, 297; 702/57, 702/58, 59, 64, 65
See application file for complete search history.

(56) References Cited

U.S. PATENT DOCUMENTS

| | | |
|---|---|---|
| 6,697,240 B2 | 2/2004 | Nelson et al. |
| 2010/0152910 A1 | 6/2010 | Taft |
| 2010/0213925 A1 | 8/2010 | Teodorescu et al. |
| 2011/0066297 A1 | 3/2011 | Saberi et al. |
| 2012/0036464 A1* | 2/2012 | Rissanen ....................... 715/771 |

OTHER PUBLICATIONS

Joe Diadamo, "SIP: The Clear Choice for Smart Grid Communications", Jun. 23, 2009, 3 pages, SmartGridNews.com, http://www.smartgridnews.com/artman/publish/commentary/SIP_The_Clear_Choice_for_Smart_Grid_Communications-604.html.
T. Khalifa et al., "A Survey of Communication Protocols for Automatic Meter Reading Applications", IEEE Communications Surveys & Tutorials, May 27, 2010, p. 1-15, vol. PP, Issue 99, IEEE Communications Society.
A. Roman-Portabales et al., "IMS Signaling for Smart Grid Home Controllers", Digest of Technical Papers—IEEE International Conference on Consumer Electronics, ICCE 2011, Jan. 12, 2011, p. 541-542, IEEE.

* cited by examiner

*Primary Examiner* — Jeffery Hofsass
(74) *Attorney, Agent, or Firm* — Matthew Chung; Roberts Mlotkowski Safran & Cole, P.C.

(57) ABSTRACT

A system and a method for detecting and localizing abnormal conditions and electrical faults in an electrical grid are provided. A method includes receiving a notification message including a state of an electrical component on an electrical grid. The method further includes displaying, by a computing system, an alarm message indicating the state of the electrical component to a system operator responsible for the electrical component such that system operator is able to determine at least one action to take in response to the state of the electrical component.

25 Claims, 7 Drawing Sheets

SYSTEM AND METHOD FOR DETECTING AND LOCALIZING ABNORMAL CONDITIONS AND ELECTRICAL FAULTS IN AN ELECTRICAL GRID

TECHNICAL FIELD

The present invention generally relates to an electrical grid, and more particularly, to a system and a method for detecting and localizing abnormal conditions and electrical faults in the electrical grid.

BACKGROUND

An electrical grid is an interconnected network for delivering electricity from suppliers to consumers. More specifically, the electrical grid is a vast, interconnected network of transmission lines, starting from a supplier of electricity to a consumer of the electricity. The consumer may be, for example, a personal consumer or an industrial consumer.

It has become increasingly important to manage the electrical grid, in order to more efficiently distribute electricity in an environmentally friendly manner. For example, the electrical grid has started to be connected to low or zero emission sources such as, e.g., windmills, hydropower plants and solar panels. In another example, electricity suppliers are providing discounted fees for off-peak electricity consumption, e.g., providing cost incentives to consumers for those using their appliances during off-peak times.

Also, it has become more vital to manage the electrical grid to distribute electricity in a more efficient manner. Electricity suppliers must often monitor their electrical grids for downed power lines and electrical faults to prevent such problems from disrupting electricity supply throughout the grids. For example, natural disasters or incidents, such as a tree falling on a power distribution line, may generate transient or sustained electrical faults in the electrical grids, thus causing temporary local or wide-area power outages. In order to provide reliable power, electricity suppliers must be able to detect such electrical faults.

However, electricity suppliers are often not provided with enough information regarding the electrical grid to effectively monitor the grid during power outages, peak demand times, etc. For example, electrical grid dispatchers may not be timely informed of abnormal conditions and/or electrical faults of electrical devices on the electrical grid until it is too late to prevent wide-area power outages. In addition, even when the electrical grid dispatchers are informed of an abnormal condition of a single electrical device, the dispatchers may be unable to adequately determine locations of abnormal conditions of electrical devices within an area of the electrical grid, since electrical grids can now include millions of electrical devices within an area.

SUMMARY

In a first aspect of the invention, a method includes receiving a notification message including a state of an electrical component on an electrical grid. The method further includes displaying, by a computing system, an alarm message indicating the state of the electrical component to a system operator responsible for the electrical component such that system operator is able to determine at least one action to take in response to the state of the electrical component.

In another aspect of the invention, a system is implemented in hardware, includes a computer infrastructure operable to receive a notification message of an electrical device on an electrical grid, the notification message including a status of the electrical device. The computer infrastructure is further operable to display the status of the electrical device on one or more electrical grid displays including at least one of a geo-spatial view, a schematic view, and a tabular view of an area of the electrical grid, for a system operator responsible for the electrical device such that the system operator is able to determine a command action for at least one of the electrical device and other electrical devices in response to the status of the electrical device.

In an additional aspect of the invention, a computer program product includes a computer usable storage medium having readable program code embodied in the storage medium. The computer program product includes at least one component operable to receive a notification message including a state of an electrical component on an electrical grid. The at least one component is further operable to display an alarm message indicating the state of the electrical component to a system operator responsible for the electrical component such that system operator is able to determine at least one action to take in response to the state of the electrical component.

In a further aspect of the invention, a method for detecting and localizing abnormal conditions and electrical faults in an electrical grid, includes providing a computer infrastructure, being operable to send a register message to register in a network, and record an electrical event at a location on the electrical grid. The computer infrastructure is further operable to send a notification message including presence information of the electrical event, through the network to a Supervisory Control and Data Acquisition (SCADA) system operable to display the presence information on an alarm display of the SCADA system, including one or more alarms indicating one or more states of electrical components on the electrical grid.

In another aspect of the invention, a computer system for detecting and localizing abnormal conditions and electrical faults in an electrical grid, includes a CPU, a computer readable memory and a computer readable storage media. First program instructions receive a notification message including a state of an electrical component on the electrical grid. Second program instructions display the state of the electrical component on an alarm display of a Supervisory Control and Data Acquisition (SCADA) system, including one or more alarms indicating one or more states of electrical components on the electrical grid. Third program instructions display the state of the electrical component on one or more electrical grid displays of the SCADA system, including at least one of a geo-spatial view, a schematic view, and a tabular view of an area of the electrical grid. The state of the electrical component includes at least one of an abnormal condition and an electrical fault detected at the electrical component. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
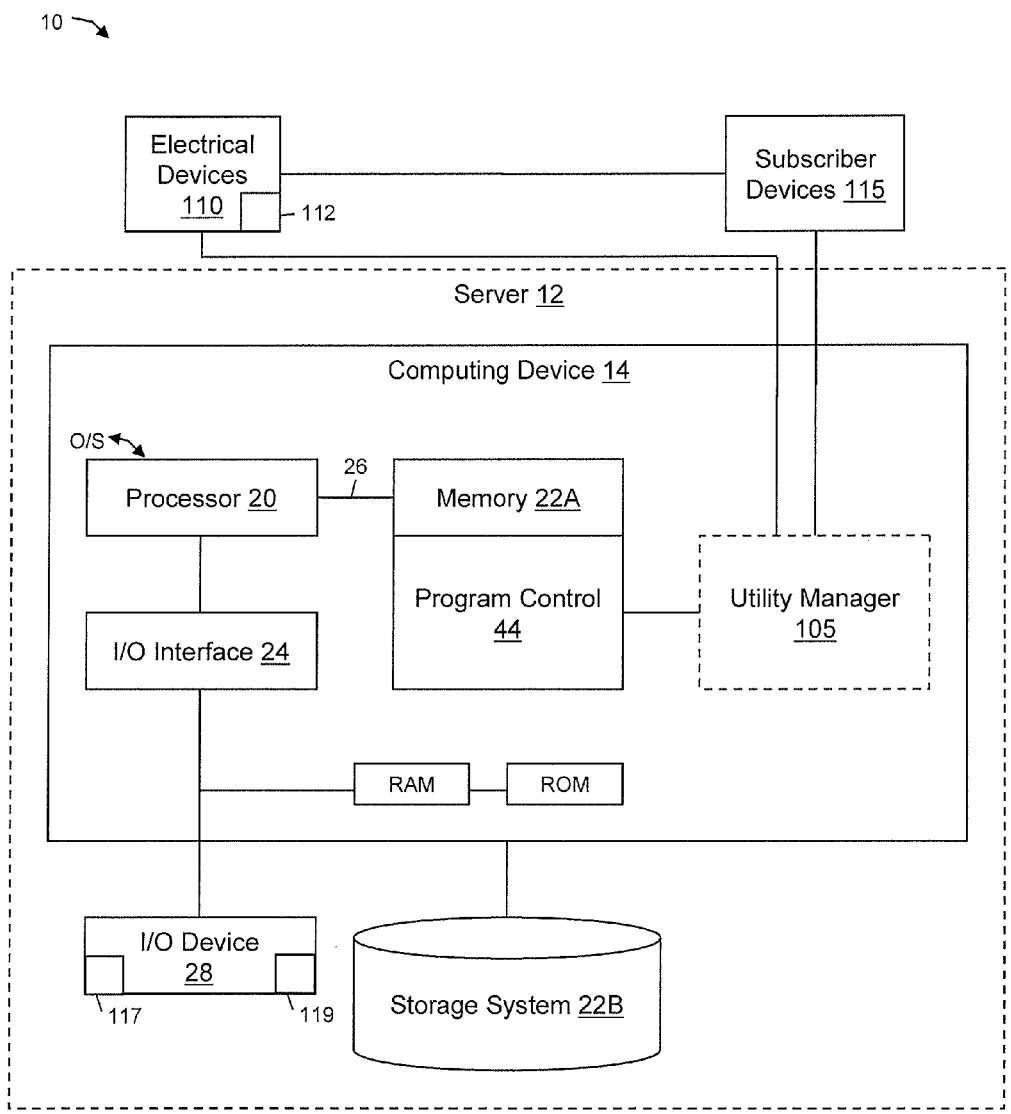
FIG. 1 shows an illustrative environment of a server and/or a computing device for implementing steps in accordance with aspects of the invention.

The present invention generally relates to an electrical grid, and more particularly, to a system and a method for detecting and localizing abnormal conditions and electrical faults in the electrical grid. In embodiments, the present invention provides communication and monitoring capabilities of the electrical grid to more effectively manage the electrical grid as it becomes ever more complex to manage. For example, to manage the many different demands on the electrical grid and to ensure that the electrical grid is working most efficiently, the present invention provides an Internet Protocol (IP) backplane with the traditional electrical grid so to allow efficient communication between a utility (e.g., service provider, electricity supplier, etc.) and electrical devices on the electrical grid.

More specifically, the present invention provides Session Initiation Protocol (SIP) as a low-latency, scalable communication protocol used by the electrical grid, particularly, between the electrical devices and the utility or electricity supplier. Further, the present invention provides a presence server in a utility domain or in a telecommunications domain. The presence server allows authorized entities, such as the utility (e.g., service provider, electricity supplier, etc.), a network service provider, and/or an individual user, to subscribe to status information of the electrical devices. This allows such entities to receive the recorded status information of the electrical devices which, in turn, allows the entities to interact with the electrical grid. The status information can provide location information, as well as other pertinent information (e.g., electrical failures, abnormal conditions), to those individuals that are servicing and/or monitoring the electrical grid. This, in turn, allows the electricity supplier (e.g., the utility or other service provider) to manage and monitor the electrical grid and thereby more efficiently and effectively control and maintain the electrical devices on the electrical grid. For example, by receiving information directly from the electrical grid, it is now possible to detect abnormal conditions and/or electrical faults directly from the electrical devices. In another example, the electricity supplier (e.g., service provider) can now monitor the electrical grid using the IP backplane in order to effectively isolate the abnormal conditions and/or the electrical faults of the electrical devices in the electrical grid.

In more specific embodiments, the IP backplane can notify a utility manager at a control center of the electricity supplier that an issue (e.g., an abnormal condition and/or an electrical fault) exists on the electrical grid, for example, at one of the electrical devices on the electrical grid. This information can be granular to the extent and location of any issue. In response to the information, the utility manager may issue an alarm to an electrical grid dispatcher or system operator at the control center that is responsible for monitoring an area of the electrical grid. The alarm indicates to the dispatcher that the issue has been detected at the electrical devices. In embodiments, the issuing of the alarm may include displaying an alarm indicating that the issue has been detected, on an alarm display of a Supervisory Control and Data Acquisition (SCADA) system. In response to the issued and/or displayed alarm, the dispatcher may perform one or more appropriate actions addressing the issue, e.g., analyze the information associated with the problematic electrical devices and/or instruct the problematic electrical devices to shut be on or off via a SIP-based command message to the electrical devices.

In accordance with further aspects of the invention, to assist the electrical grid dispatcher in visualizing or localizing the issue detected at the electrical devices, the utility manager or any third party service provider can display the issue onto one or more electrical grid displays of the SCADA system. More specifically, the utility manager may display the issue onto a geo-spatial (e.g., map-like), schematic (e.g., more detailed, diagram), and/or tabular view of the electrical grid displays. For example, in a geo-spatial view, one or more abnormal conditions detected at the electrical devices may be clustered into a color-coded (e.g., red or green) area of a map of the electrical grid, that is displayed on the geo-spatial view to indicate that such an area includes the problematic electrical devices.

With the issue at the electrical devices detected and localized on the displays of the SCADA system, the electrical grid dispatcher or any third party service provider, via the utility manager, can send to the problematic electrical devices (and/or nearby electrical devices) a SIP-based command message that instructs the electrical devices (and/or the nearby electrical devices) to execute a reconfiguration of the electrical devices. This SIP-based command message may allow the electrical devices to be isolated on the electrical grid. Once the issue is isolated, the utility manager may analyze the electrical devices on the electrical grid to determine a switching plan for the electrical devices that would restore power service to as many customers as possible.

Advantageously, the present invention provides utilities additional information (e.g., a voltage, a current, an abnormal condition, an electrical fault, etc.) of electrical devices via remote, on-demand notifications from the electrical devices. In addition, the present invention provides more remote control of the electrical devices to the utilities to isolate electrical faults on the electrical grid and subsequently restore services. The present invention allows the utility to obtain more accurate, real-time information of electrical patterns across the electrical grid. By utilizing telecommunications technology and the Mobile Web, the electrical grid is fully-integrated with and connected to the Internet and can be managed to a more granular level.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard, etc.

In general, the processor 20 executes computer program code (e.g., program control 44), which can be stored in the memory 22A and/or storage system 22B. Moreover, in accordance with aspects of the invention, the program control 44 controls a utility manager 105, e.g., the processes described herein. The utility manager 105 communicates with one or more electrical devices 110 (on an electrical grid) and one or more subscriber devices 115. The communication between the utility manager 105, the electrical devices 110, and the subscriber devices 115 can be through, for example, Session Initiation Protocol (SIP) messaging using, e.g., instant messaging or other communications utilizing SIP.

As should be understood by those of skill in the art, SIP is a signaling protocol widely used for controlling multimedia communication sessions, such as voice and video calls over Internet Protocol (IP). The SIP can be used for creating, modifying, and terminating two-party (unicast) or multiparty (multicast) sessions consisting of one or several media streams. In embodiments, the present invention implements SIP as video conferencing, streaming multimedia distribution, instant messaging, presence information and/or file transfer applications. In embodiments, SIP can be implemented as a text-based protocol, incorporating many elements of the Hypertext Transfer Protocol (HTTP) and the Simple Mail Transfer Protocol (SMTP). Also, as used in the present invention, SIP is an Application Layer protocol designed to be independent of the underlying transport layer, and as such, can run on Transmission Control Protocol (TCP), User Datagram Protocol (UDP), or Stream Control Transmission Protocol (SCTP).

The utility manager 105 can be implemented as one or more program code in the program control 44 stored in memory 22A as separate or combined modules. Additionally, the utility manager 105 may be implemented as separate dedicated processors or a single or several processors to provide the function of this tool. Moreover, it should be understood by those of ordinary skill in the art that the utility manager 105 is used as a general descriptive term for providing the features and/or functions of the present invention, and that the utility manager 105 may comprise many different components such as, for example, components and/or infrastructure described and shown with reference to FIGS. 2-3.

In embodiments, each of the electrical devices 110 can be any device involved in the generation, transmission, and/or distribution of electricity on an electrical grid such as, for example, fuses, transformers, circuit breakers, capacitors, voltage regulators, compensators, relays, feeders, switches, protection devices, gateways (e.g., a router), solar panels, plug-in electric vehicles, and/or any other electrical grid infrastructure devices. The electrical devices 110 may be located at, for example, an electrical substation, a power station, or anywhere in a transmission line, on the electrical grid. Further, the electrical devices 110 may be located within various types of electrical grids, e.g., a low-voltage (up to 60 kilovolts (kV)) grid, a high-voltage (110 kV and up) grid, and/or an extra high-voltage (265 kV and up, AC and high-voltage DC (HVDC)) grid.

In embodiments, each of the electrical devices 110 includes a monitoring device 112. The monitoring device 112 can be any type of electrical monitoring device such as, for example, a voltage meter, a current meter, etc., with the capability of transmitting monitored status information (e.g., voltages or currents of the electrical devices 110) to the utility manager 105, e.g., via SIP. In embodiments, the monitoring device 112 transmits the monitored status information to the utility manager 105 and/or the subscriber devices 115. In embodiments, the monitoring device 112 may also transmit presence information to the utility manager 105 and/or the subscriber devices 115. In embodiments, the presence information (presence state) is provided by a network connection to a presence service, which can be, for example, depicted as the utility manager 105 (or other third party device). In embodiments, the presence information may include the status information of the electrical devices 110, the type of the electrical devices 110, and its specifications. In further embodiments, a location of a particular one of the electrical devices 110 may also be provided, for example, using presence information or through a look-up table in the computing device 14. As to the latter scenario, once presence information is received at the computing device 14, this information may be matched in the look-up table with pertinent location information for the electrical devices 110.

In accordance with further aspects of the invention, the monitoring device 112 can determine whether an abnormal condition and/or an electrical fault are at one of the corresponding electrical devices 110. In embodiments, this determining may include determining a monitored electrical state (e.g., a voltage and/or a current) of one of the electrical devices 110, comparing the monitored electrical state to a normal operating electrical state or mode, and determining whether the monitored electrical state is abnormal (e.g., greater in value) compared to the normal operating mode. If the monitoring device 112 determines that an abnormal condition and/or an electrical fault are at one of the electrical devices 110, then the monitoring device 112 may transmit a SIP-based notification message indicating that the abnormal condition and/or the electrical fault have been detected at one of the electrical devices 110. This SIP-based notification message may be transmitted to the utility manager 105 and/or the subscriber devices 115.

In embodiments, each of the subscriber devices 115 (e.g., a smartphone, a personal computer (PC), a laptop, etc.) is in communication with the utility manager 105 and/or the electrical devices 110. For example, in embodiments, the subscriber devices 115 can be used by a field crew and/or a dispatcher of a service provider or an electricity supplier at a utility control center.

In implementation, the subscriber devices 115 can send and receive messages to and from the utility manager 105 in order to manage the electrical devices 110. For example, through SIP messaging, the subscriber devices 115 may subscribe to and receive status information from the electrical devices 110, to interact with and detect abnormal conditions and/or electrical faults at the electrical devices 110. This status information may be received by the subscriber devices 115 and/or the utility manager 105. The subscriber devices 115 may also send a request to the utility manager 105 for the status information of the electrical devices 110.

In embodiments, through the use of rules stored in the storage system 22B, for example, the utility manager 105 can perform one or more actions to take in response to status information received from the electrical devices 110. More specifically, the rules indicate what constitute critical events (e.g., abnormal conditions and/or electrical faults) at the electrical devices 110 and how to manage the electrical devices 110 upon the occurrence of the critical events (e.g., isolate the electrical faults via a command message to the electrical devices 110 to reconfigure the electrical devices 110). Accordingly, management of the electrical devices 110 may be accomplished remotely via the utility manager 105.

In operation, for example, the utility manager 105 can be located at a distribution feeder head or a transmission substation, on an electrical grid. The utility manager 105 may receive from at least one of the electrical devices 110 a SIP-based notification message which indicates that an abnormal condition or an electrical fault has been detected at the electrical devices 110. In response to this message, the utility manager 105 may determine at least one rule indicating at least one action to take and perform the action to take based on the rule and the notification message. For example, the determined rule may instruct the utility manager 105 to issue an alarm to an electrical grid dispatcher or system operator of a utility (e.g., an electricity supplier) that is responsible for monitoring an area of the electrical grid. The alarm indicates to the dispatcher that the abnormal condition or the electrical fault has been detected at the electrical devices. In embodiments, the issuing of the alarm may include displaying an alarm indicating that the abnormal condition or the electrical fault has been detected, on an alarm display 117 of a Supervisory Control and Data Acquisition (SCADA) system, e.g., the I/O device 28. In embodiments, the alarm display 117 of the SCADA system may include at least one alarm indicating whether an abnormal condition and/or an electrical fault has been detected at a respective electrical device on the electrical grid. In response to the issued alarm, the dispatcher may take one or more appropriate actions addressing the abnormal condition, e.g., analyze the status information of the problematic electrical devices and/or instruct the problematic electrical devices to shut off via a SIP-based command message to the electrical devices.

In accordance with further aspects of the invention, the alarm display 117 can be adjacent to one or more electrical grid displays 119 of the SCADA system, e.g., the I/O device 28. Each of the electrical grid displays 119 may include at least one view of at least one area of the electrical grid, and the view may be geo-spatial (e.g., map-like), schematic (e.g., more-detailed), and/or tabular in nature. For example, a geo-spatial view may include a geographic map of an area of the electrical grid, and one or more indicators placed on the map that describe electrical devices and/or events in the electrical grid. In another example, a schematic view may include a more-detailed map or diagram of an area (e.g., a building and/or a power station) of the electrical grid, and one or more indicators placed on the diagram that describe electrical devices and/or events in the electrical grid. In addition, a tabular view may include a table of electrical devices and/or events in an area of the electrical grid.

In embodiments, to assist the electrical grid dispatcher in visualizing or locating an abnormal condition and/or an electrical fault that has detected at the electrical devices 110, the utility manager 105 can display the abnormal condition and/or the electrical fault onto the one or more electrical grid displays 119 of the SCADA system. More specifically, the utility manager 105 may display the abnormal condition onto a geo-spatial, schematic, and/or tabular view of the electrical grid displays 119. For example, in a geo-spatial view, one or more abnormal conditions detected at the electrical devices 110 may be clustered into a color-coded (e.g., red or green) area of a map of an electrical grid, that is displayed on the geo-spatial view to indicate that such an area includes problematic electrical devices. The displaying of the abnormal conditions on views of the SCADA system allow the dispatcher to locate or localize the abnormal conditions and to better isolate such problems in order to prevent potential cascading electrical events.

Advantageously, the present invention provides electricity suppliers (e.g., the utility manager 105) with accurate and up-to-date information of electrical devices (e.g., the electrical devices 110) on an electrical grid, to ensure its reliability. The present invention also provides electricity suppliers with real-time control of electrical devices on an electrical grid, to better react to and prevent power outages. Further, the present invention provides integration of an electrical grid and the Internet by using low latency communications, such as SIP and/or User Datagram Protocol (UDP) communications.

While executing the computer program code, the processor 20 can read and/or write data to/from memory 22A, storage system 22B, and/or I/O interface 24. The program code executes the processes of the invention, for example, functions of the utility manager 105, e.g., managing the electrical devices 110 of the electrical grid. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
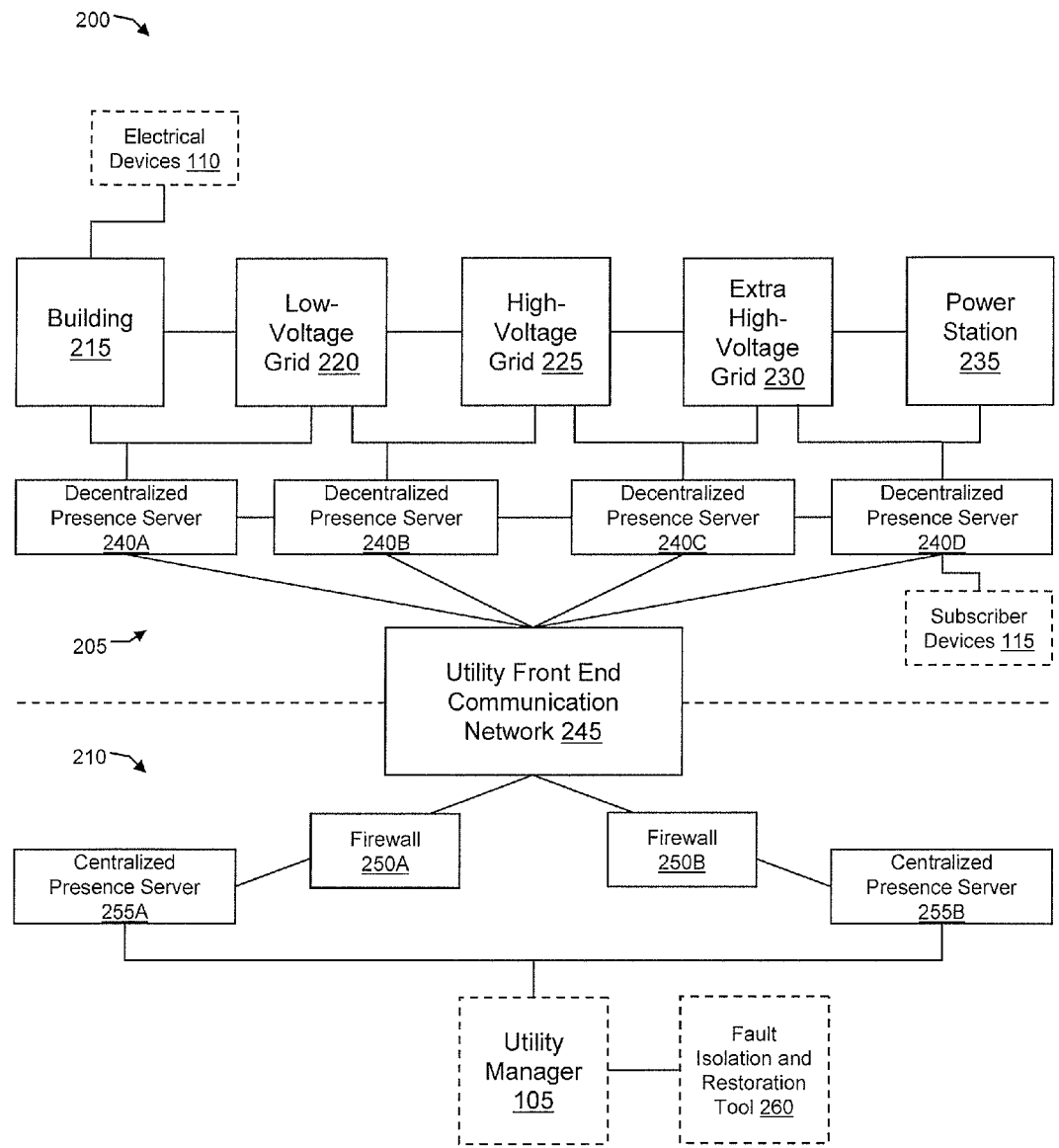
FIG. 2 shows another illustrative environment for implementing steps in accordance with aspects of the invention.

FIG. 2 shows an illustrative environment 200 for implementing the steps in accordance with aspects of the invention. The environment 200 includes a utility front end 205 and a utility back end 210. In embodiments, the utility front end 205 can include the electrical devices 110 and the subscriber devices 115, and the utility back end 210 can include the utility manager 105. In embodiments, the utility manager 105, the electrical devices 110, and the subscriber devices 115 may include the utility manager 105, the electrical devices 110, and the subscriber devices 115, respectively, in FIG. 1. Each of the electrical devices 110 may include a device involved in the generation, transmission, and distribution of electricity, such as a fuse, a transformer, a circuit breaker, a capacitor, a voltage regulator, a reactor, a compensator, a relay, a feeder, a switch, a protection device, a gateway (e.g., a router), solar panels, plug-in electric vehicles, and/or any other electrical grid infrastructure device, for example. The electrical devices 110 may be located at, for example, an electrical substation, a power station, and/or anywhere along a transmission line in an electrical grid. The electrical devices 110 include a lightweight SIP client and a radio antenna connected to the SIP client, allowing the electrical devices 110 to communicate in SIP with other entities that can also communicate in SIP, such as the utility manager 105 and the subscriber devices 115.

In embodiments, the utility front end 205 can further include various types of premises and grids (e.g., "micro grids") within the overall electrical grid, e.g., a building 215, a low-voltage grid 220, a high-voltage grid 225, an extra high-voltage grid 230, and/or a power station 235. The building 215 (e.g., a hospital building and/or a complex of buildings), the grids 220, 225, and 230, and the power station 235 may be electrically connected to each other, and may generate, transmit, and distribute electricity between each other. Each of the grids or micro grids 220, 225, 230 may provide electricity to at least one respective neighborhood, e.g., a group of buildings and/or devices within each of the grids 220, 225, 230. In other words, each of the grids 220, 225, 230 is a portion of the overall electrical grid.

In accordance with further aspects of the invention, each of the building 215, the grids 220, 225, 230, and the power station 235 may include a SIP client or gateway within their location areas and a radio antenna connected to the SIP client or gateway, allowing the building 215, the grids 220, 225, 230, and the power station 235 to communicate in SIP with other SIP-enabled entities. The electrical devices 110 may be within the location areas of the building 215, the grids 220, 225, 230, and/or the power station 235. It should be understood that the electrical devices 110 may be within the building 215, and the utility manager 105 can provide control to manage the generation, transmission, and distribution of electricity in the building 215. Accordingly, the present invention is capable of being implemented in a micro level (e.g., within a building 215 or a complex of buildings) or a macro level (e.g., the electrical grid).

In embodiments, the utility front end 205 can include decentralized presence servers 240A, 240B, 240C, and 240D, which can be located in front end electrical premises of a utility or an electrical grid, e.g., the building 215, the grids 220, 225, and/or 230, and the power station 235. The decentralized presence servers 240A, 240B, 240C, 240D may be in communication with the building 215, the grids 220, 225, and/or 230, and the power station 235, for example, over SIP. The decentralized presence servers 240A, 240B, 240C, 240D may also be in communication with the subscriber devices 115 (shown in connection to the decentralized presence server 240D), as well as a utility front end communication network 245.

In embodiments, each of the subscriber devices 115 can be any device (e.g., a smartphone, a personal computer (PC), and/or a laptop) that interfaces with a subscriber (e.g., a field crew or a dispatcher of an electricity supplier). Like the electrical devices 110, the subscriber devices 115 also includes a lightweight SIP client and a radio antenna connected to the SIP client, which allow the subscriber devices 115 to communicate in SIP with other SIP-based entities, such as the decentralized presence servers 240A, 240B, 240C, 240D. In embodiments, each of the subscriber devices 115 may also include a web client that allows the subscriber devices 115 to communicate in Hypertext Transfer Protocol (HTTP) with other entities that can also communicate in HTTP, e.g., the decentralized presence servers 240A, 240B, 240C, 240D. In embodiments, the subscriber devices 115 may be connected to a presence server of the utility back end 210.

In accordance with further aspects of the invention, components of the utility front end 205 are in communication with components of the utility back end 210, via the utility front end communication network 245. In embodiments, the utility front end communication network 245 can be operated by, e.g., a utility or electricity supplier. The utility front end communication network 245 may also be any type of communication network, such as the Internet, a cellular network, etc.

In embodiments, the utility back end 210 can include firewalls 250A and 250B and centralized presence servers 255A and 255B. The firewalls 250A, 250B are in communication with the utility front end communication network 245, for example, over SIP and/or HTTP. Each of the firewalls 250A, 250B may include a computing device operable to permit or deny messages or transmissions from the utility front end 205 based on rules defined by the utility. For example, the firewalls 250A, 250B may be instructed to permit messages from only authorized presence servers, e.g., the decentralized presence servers 240A, 240B, 240C, 240D. The centralized presence servers 255A, 255B are in communication with the firewalls 250A, 250B, for example over SIP and/or HTTP. Through the firewalls 250A, 250B, the centralized presence servers 255A, 255B may receive the permitted messages of the decentralized presence servers 240A, 240B, 240C, 240D.

The centralized presence servers 255A, 255B may further be in communication with the utility manager 105 over, e.g., SIP and/or HTTP. The centralized presence servers 255A, 255B, and the utility manager 105 may be located in a back end, centralized premise of the utility or electricity supplier, e.g., a distribution, transmission, and generation control center, an Independent System Operator (ISO)/Regional Transmission Organization (RTO) grid control center, etc. In alternative embodiments, the utility manager 105 may be located in front end electrical premises of the utility or of an electrical grid (e.g., the building 215, the grids or micro grids 220, 225, and/or 230, and the power station 235), and may be in communication with the decentralized presence servers 240A, 240B, 240C, 240D.

In operation, the decentralized presence servers 240A, 240B, 240C, 240D can receive a SIP-based notification message from an electrical device (e.g., one of the electrical devices 110) located in, for example, the building 215, the grids or micro grids 220, 225, and/or 230, and/or the power station 235. In embodiments, the notification message may include an indication that an abnormal condition and/or an electrical fault have been detected locally by the electrical device. In embodiments, the abnormal condition or critical event may include, for example, any combination of the following:

(i) indication that a voltage at the electrical device is greater or less than a predetermined threshold;

(ii) indication that a frequency at the electrical device is greater or less than a predetermined threshold;

(iii) indication that a current at the electrical device is greater or less than a predetermined threshold;

(iv) indication of a short circuit at the electrical device; and/or (v) indication that the electrical device (e.g., a circuit breaker) is closed when it should be open, and vice versa.

In a centralized approach, the decentralized presence servers 240A, 240B, 240C, 240D may forward the notification message through the utility front end communication network 245 and the firewalls 250A, 250B to the centralized presence servers 255A, 255B. At least one authorized watcher (e.g., the utility manager 105) in the utility back end 210 may be subscribed to the centralized presence servers 255A, 255B to watch for (e.g., receive) the notification message. In embodiments, the watcher may include a Supervisory Control and Data Acquisition (SCADA) system that, in response to the notification message, issues a SIP-based alarm message to be displayed to a system operator (e.g., an electrical grid dispatcher) responsible for a particular area where the abnormal condition and/or the electrical fault is located. The SCADA system and/or the system operator may suggest a possible reconfiguration of the electrical device and nearby electrical devices to isolate (e.g., reroute power away from) the abnormal condition and/or the electrical fault.

More specifically, for example, the issuing of the alarm message may be displayed on an alarm display of the SCADA system, e.g., the alarm display 117 of the I/O device 28 in FIG. 1. In embodiments, the alarm display of the SCADA system may include one or more alarms indicating whether abnormal conditions and/or electrical faults have been detected at respective electrical devices on the electrical grid. In response to an issued alarm message, the electrical grid dispatcher may take one or more appropriate actions addressing an abnormal condition, e.g., analyze status information of a corresponding electrical device, command the electrical device to shut off and isolate the abnormal condition, etc.

In accordance with further aspects of the invention, to assist the electrical grid dispatcher in visualizing and/or locating an abnormal condition and/or an electrical fault that has been detected at an electrical device, the watcher may display the abnormal condition and/or the electrical fault onto one or more electrical grid displays of the SCADA system, e.g., the electrical grid displays 119 of the I/O device 28 in FIG. 1. More specifically, the watcher may display the abnormal condition onto a geo-spatial (e.g., map-like), schematic (e.g., more-detailed, diagram), and/or tabular view of the electrical grid displays. For example, in a geo-spatial view, one or more abnormal conditions detected at one or more electrical devices may be clustered into group, which is displayed as a color-coded (e.g., red or green) area on a map of an electrical grid to indicate that the area includes electrical devices with abnormal conditions. The displaying of the abnormal conditions on a view of the SCADA system allows the dispatcher to localize the abnormal conditions and to better determine how to isolate such abnormal conditions to prevent further problems on the electrical grid.

In embodiments, when the authorized watcher receives a SIP-based notification message indicating that an electric device has detected an electrical fault, the watcher may send or forward the notification message to a generation, transmission, distribution or outage management system and/or a fault isolation and restoration tool 260 of the utility, e.g., the electricity supplier. In response to the notification message, the fault isolation and restoration tool 260 evaluates an extent of the electrical fault, a blackout area, and/or an instable section of an electrical grid, and identifies (automatically or manually) switching steps to isolate the electrical fault. Such steps may be executed by sending SIP-based command messages to electrical devices (e.g., switches) on the electrical grid, via the decentralized presence servers 240A, 240B, 240C, 240D. For example, the command message may include a fault isolation command message that instructs the electrical devices to execute requested configuration changes (e.g., switch on or off) aimed at isolating the electrical fault. Later, when the electrical fault has been isolated and/or remedied, the fault isolation and restoration tool 260 may send SIP-based command messages to the electrical devices that instruct them to resume generating and/or transmitting electricity and to restore power to consumers. Advantageously, the present invention allows the utility to interact with electrical devices on an electrical grid in a centralized manner, and to isolate electrical faults, avoiding cascading events, e.g., further blackouts in areas of the electrical faults.

In accordance with further aspects of the invention, when the authorized watcher receives a SIP-based notification message indicating that an electric device has detected an electrical fault, the watcher may generate, send, and/or forward the notification message to a subscriber device (e.g., one of the subscriber devices 115) of a field crew close to a location of the faulted electrical device. In embodiments, the notification message received at the subscriber device may include, for example, a map depicting a location of the electrical device, along with information associated with the electrical fault, e.g., instructions on how to isolate the electrical fault. The field crew may then decide to create a work order to directly isolate or cure the electrical fault at the electrical device. Advantageously, the present invention reduces the time of isolating and restoring faulty electrical devices via SIP messaging to field crews nearby such electrical devices.

In embodiments, the decentralized presence servers 240A, 240B, 240C, 240D can receive a SIP-based notification message from an electrical protection device (e.g., one of the electrical devices 110) on the electrical grid. In embodiments, the electrical protection device may include, for example, an over-current protection device operable to detect that a current threshold is about to be violated, which indicates that an electrical fault may occur at an electrical device near the protection device. The decentralized presence servers 240A, 240B, 240C, 240D may forward the notification message through the utility front end communication network 245 and the firewalls 250A, 250B to the centralized presence servers 255A, 255B. At least one authorized watcher (e.g., the utility manager 105) in the utility back end 210 may be subscribed to the centralized presence servers 255A, 255B to watch for (e.g., receive) the notification message.

In accordance with further aspects of the invention, the watcher may, in response to the notification message, issue a SIP-based alarm or warning message to be displayed on a SCADA system (e.g., the I/O device 28 in FIG. 1) and to a SCADA system operator (e.g., an electrical grid dispatcher) responsible for a particular area where the electrical threshold is about to be violated. Alternatively or additionally, the watcher may display the warning message on a geo-spatial, schematic, or tabular view of the electrical grid, e.g., display a color on an area of a map that indicates the area of the electrical grid where the electrical threshold may be violated. Such a displayed warning message provides the electrical grid dispatcher with the necessary information to decide whether to reconfigure electrical devices to avoid violating the electrical threshold of the electrical protection device and thus, to avoid a potential power outage.

In a decentralized approach, at least one authorized watcher (e.g., the subscriber devices 115) in the utility front end 205 can be subscribed to the decentralized presence servers 240A, 240B, 240C, 240D to watch for (e.g., receive) the notification message from the electrical device. In embodiments, the watcher in the utility front end 205 may initiate automatic switching steps to isolate the abnormal condition and/or the electrical fault. For example, these switching steps may be executed by sending SIP-based command messages to electrical devices (e.g., switches) on the electrical grid. The command message may include a fault isolation command message that instructs the electrical devices to execute requested configuration changes (e.g., switch on or off) aimed at isolating the electrical fault or abnormal condition. Advantageously, the decentralized approach of the present invention enables faster fault isolation, is closer to a self-healing system, and allows for fault isolation even when incidents (e.g., blackouts, communication network problems) cause the utility front end 205 to be cut off from the utility back end 210.

In a hybrid (centralized and decentralized) approach, the watcher in the utility front end 205 can forward the notification message along with any switching steps already performed to a watcher (e.g., the utility manager 105) in the utility back end 210. The utility back end watcher may take additional steps ensure the stability of the electrical grid, such as send additional command messages to other electrical devices to isolate electrical faults. Further, once the electrical faults are isolated, the utility back end watcher may initiate an automated or manual service restoration process to restore power to as many customers as possible.

Figure 3:
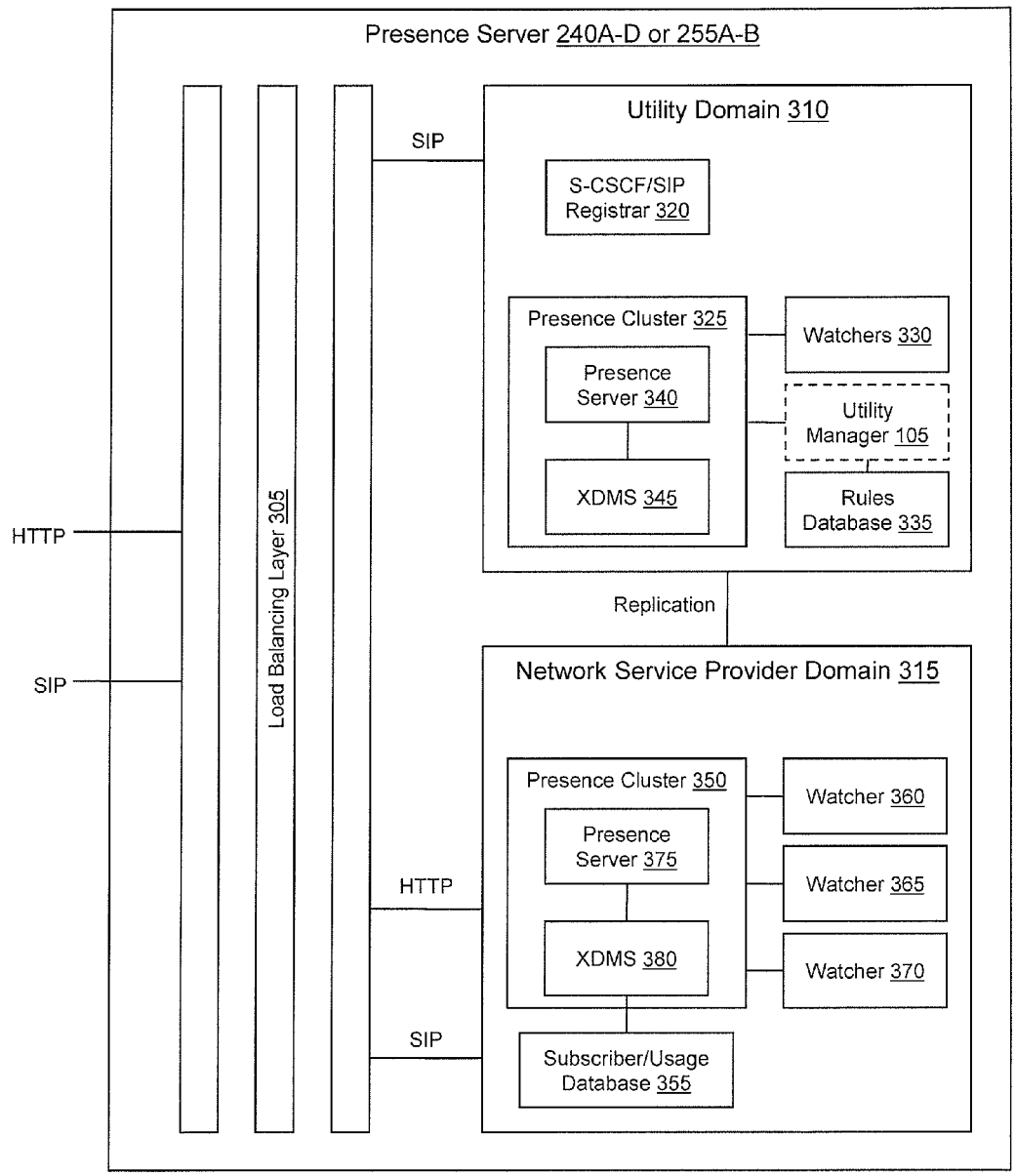
FIG. 3 shows one or more presence servers for implementing steps in accordance with aspects of the invention.

FIG. 3 shows an illustrative environment of the presence server 240A, 240B, 240C, 240D, 255A, or 255B, for implementing steps in accordance with aspects of the invention. In embodiments, the presence server 240A, 240B, 240C, 240D, 255A, or 255B can include a load balancing layer 305, a utility domain 310, and a network service provider domain 315. Components (e.g., the electrical devices 110 and the subscriber devices 115 in FIGS. 1-2) communicate with the domains 310, 315 via the load balancing layer 305 which may distribute data (e.g., a load) evenly between the above entities. For example, the load balancing layer 305 may be provided in a network switch and a gateway router, which may be implemented in the computing device 14 of FIG. 1. The load balancing layer 305 includes a SIP client and a web client such that the load balancing layer 305 is able to communicate in SIP and HTTP with other SIP-enabled and/or HTTP-enabled entities.

The utility domain 310 is a network domain of an electricity supplier, a utility provider, and/or other service provider. In embodiments, the utility domain 310 can include a Serving Call Session Control Function (S-CSCF)/SIP registrar 320, a presence cluster 325, the utility manager 105, one or more watchers 330, and a rules database 335. The S-CSCF/SIP registrar 320 is a SIP server that controls SIP sessions between components (e.g., the electrical devices 110 and the subscriber devices 115 in FIGS. 1-2) and the domains 310, 315. In particular, the S-CSCF/SIP registrar 320 handles SIP registrations of the electrical devices 110 and the subscriber devices 115. So, over and above a Mobile Subscriber Integrated Services Digital Network Number (MSISDN) of these entities, they are registered as IP Multimedia Subsystem (IMS)/SIP clients in the domains 310, 315. In embodiments, the S-CSCF/SIP registrar 320 may be implemented in the server 12 and/or the computing device 14 in FIG. 1, and may be alternatively located in the network service provider domain 315 and/or a third-party location. After registration, the S-CSCF/SIP registrar 320 forwards SIP messages from the electrical devices 110 and the subscriber devices 115 to components in the domains 310, 315, such as the presence cluster 325.

The presence cluster 325 includes a presence server 340 and an Extensible Markup Language (XML) Data Management Server (XDMS) 345. The presence server 340 is a SIP application server that communicates and stores presence information of client devices, such as the electrical devices 110 and the subscriber devices 115. The presence server 340 can be implemented in the server 12 of FIG. 1 and, for example, in the utility manager 105. Specifically, the presence server 340 receives SIP notify messages including the presence information from the client devices. In the case of the electrical grid, the presence information may include, for example, locations of the electrical devices 110. Further, the presence information may include the status information of the electrical devices 110 that indicates a voltage, current, and/or power, generated or transmitted by each of the electrical devices 110. In embodiments, the status information of the electrical devices 110 may include, for example, the following:

(i) a voltage at one of the electrical devices 110;
(ii) a reactive power at one of the electrical devices 110;
(iii) a real power at one of the electrical devices 110;
(iv) an open or closed (e.g., turned on or off) status of one of the electrical devices 110; and/or
(v) a tap position of one of the electrical devices 110 (e.g., a transformer).

In accordance with further aspects of the invention, the presence information can include an indication that an abnormal condition and/or an electrical fault have been detected locally by at least one of the electrical devices 110. An indication of an abnormal condition (e.g., a critical event) may include, for example, the following:

(i) indication that a voltage at one of the electrical devices 110 is greater or less than a predetermined threshold;
(ii) indication that a frequency at one of the electrical devices 110 is greater or less than a predetermined threshold; and/or
(iii) indication that a current at one of the electrical devices 110 is greater or less than a predetermined threshold.

With this received presence information, the presence server 340 sends the presence information to the XDMS 345 that builds or updates a presence document including the presence information. In embodiments, this presence document can include the presence information of all electrical devices and subscriber devices within a specified area of the electrical grid. The presence document may include multiple nodes, or in other words, the presence document may refer to multiple areas in the electrical grid and their associated client devices. In embodiments, the presence document and the SIP messages can be in a XML format, a Rich Presence Information Data (RPID) format, and/or a Presence Information Data Format (PDIF). The XDMS 345 may be implemented in the server 12 of FIG. 1.

Additionally, the presence server 340 receives SIP subscribe messages from the client devices, for example, the subscriber devices 115 and the utility manager 105. The SIP subscribe messages are requests to receive (e.g., to subscribe to) updates about the presence information from the presence server 340. The presence server 340 manages these SIP subscribe messages from the client devices and when there is an update about the presence information, the presence server 340 automatically sends SIP publish messages (with the presence information) quickly and effectively to the subscribing client devices (e.g., the subscriber devices 115 and the utility manager 105). The presence server 340 may send information regarding the subscribing client devices ("subscriber presence information") to the XDMS 345, which may then update the corresponding presence document to include such subscriber presence information. As a result, the presence document may include information regarding relationships between electrical devices and subscribing client devices interested in receiving updated presence information with respect to these electrical devices. That is, the presence document can associate each of its nodes to the subscriber, enabling enhanced utility data tracking with tight association to the specific subscriber or the utility provider that may be responsible for reconfiguring one or more electrical devices.

The presence information and other pertinent information can be provided to the utility manager 105 via SIP messaging. By quickly updating the utility manager 105 with the presence information of the electrical devices 110 via a SIP channel, the utility manager 105 can rapidly react to any notification in a temporally and channel-appropriate manner. For example, the utility manager 105 can react to a notification "out-of-band," e.g., dispatch a field crew to the electrical device to manually configure the electrical devices 110 if the notification indicates that the field crew can safely work with the electrical devices 110. In another example, the field crew and/or the utility manager 105 can react to a notification "in-band," e.g., remotely send a command message (e.g., a SIP message) to the electrical devices 110 to turn on or off the electrical devices 110. In embodiments, the command message may include instructions for the electrical devices 110 to change their configurations in various ways, such as to be re-energized or de-energized and to increase or decrease a voltage generated by one of the electrical devices 110, for example, in order to isolate an electrical fault detected by the utility manager 105. In addition, the presence cluster 325 (specifically, the XDMS 345) may update the presence document pertaining to the electrical devices 110 to include information regarding the command message sent to the electrical devices 110. In embodiments, the field crew and/or the utility manager 105 may send the command message through the presence server 340 (updating the pertinent presence document) to the electrical devices 110. Advantageously, the use of SIP messaging is massively scalable and results in low latency communications between the electrical devices 110, the subscriber devices 115, the presence server 340, and/or the utility manager 105.

The watchers 330 are entities in the utility domain 310 that send SIP subscribe messages to the presence cluster 325 to subscribe to updates regarding the presence information in the presence server 340, e.g., the SIP publish messages. For example, at least one of the watchers 330 can represent the utility provider (e.g., a dispatcher at a utility control center), and may be implemented in the computing device 14 in FIG. 1. By subscribing to the SIP publish messages, the watcher 330 are able to watch for notifications of the critical events and the status information of the electrical devices 110. In addition, the watchers 330 are able to react to these notifications as necessary. For example, if at least one of the watchers 330 represents the utility provider and observes a notification of an abnormal condition at one of the electrical devices 110, the at least one of the watchers 330 may cut electricity to the electrical devices 110 (possibly via the command message to the electrical devices 110), to prevent further abnormal conditions at other electrical devices. In further embodiments, each of the watchers 330 may watch for SIP publish messages to perform at least one of the various functions of the present invention, e.g., issue an alarm to an electrical grid dispatcher, display an abnormal condition on a map to the electrical grid dispatcher, send a notification to a field crew and/or a fault/isolation restoration tool, etc.

The rules database 335 includes and stores rules set by the subscriber, the service provider, and/or the utility manager 105 regarding monitoring and control of the electrical devices 110. For example, the rules can indicate that the subscriber has allowed the utility provider (e.g., the utility manager 105) to control the electrical devices 110. The rules may also indicate what constitutes critical events at the electrical devices 110 that require control of the electrical devices 110 and thus, include event lists and event categories. For example, these critical events can include at least one of the electrical devices 110 (i) generating or transmitting power over or under a predetermined threshold, (ii) being on or off, (iii) indicating a blown fuse or a maintenance signal, (iv) overheating, (v) having an electrical fault, etc. The control of the electrical devices 110 may be accomplished via the utility manager 105 (and/or another watcher) sending or forwarding a command message to the electrical devices 110 that is determined from the rules database 335.

The command message can include a command indicating to the electrical devices 110 which actions to take in response to a critical event at the electrical devices 110. For example, the command message may include a SIP-based fault isolation command message that instructs the electrical devices 110 to execute requested configuration changes (e.g., switch on or off) aimed at isolating an abnormal condition and/or an electrical fault in at least one of the electrical devices 110. In another example, the rules may indicate to the utility manager 105 to issue an alarm for an electrical grid dispatcher response for an area of the electrical grid to take appropriate actions addressing the abnormal condition and/or the electrical fault. In embodiments, the rules database 335 may be set by a subscriber, a service provider, etc., via the subscriber devices 115.

The network service provider domain 315 is a network domain of an Internet service provider and/or a cellular service provider. In embodiments, the network service provider domain 315 can include a presence cluster 350, a subscriber/usage database 355, and watcher 360, 365, and 370. The presence cluster 350 includes a presence server 375 and a XDMS 380, which perform functions similar to those of the presence server 340 and the XDMS 345 in the utility domain 310. In fact, all information (e.g., the presence information and the subscriber presence information) received and processed in the presence server 340 and the XDMS 345 in the utility domain 310 may be transferred to, or replicated in, the presence server 375 and the XDMS 380 in the network service provider domain 315, and vice versa. In embodiments, replication in the domains 310, 315 can be accomplished via peering and dedicated bandwidth between the domains 310, 315. In embodiments, the presence servers 340, 375 may be in a hierarchal relationship, for example, where the presence server 340 is a primary, master server and the presence server 375 is a secondary, slave server.

The subscriber/usage database 355 receives the built or replicated presence documents from the XDMS 380 and stores the presence documents for the system. The watcher 360, 365, 370 are entities in the network service provider domain 315 that send SIP subscribe messages to the presence cluster 350 to subscribe to updates regarding the presence information in the presence server 375, e.g., the SIP publish messages. For example, at least one of the watcher 360, 365, 370 can represent the utility provider (e.g., a dispatcher at a utility control center), and may be implemented in the computing device 14 in FIG. 1.

By subscribing to the SIP publish messages, the watcher 360, 365, 370 are able to watch for notifications of the critical events and the status information of the electrical devices 110. In addition, the watcher 360, 365, 370 are able to react to these notifications as necessary. For example, if the watcher 355 represents the utility provider and observes a notification of an electrical fault at one of the electrical devices 110, the watcher 355 may cut electricity to the one of the electrical devices 110 (possibly via the command message to the one of the electrical devices 110), to prevent further abnormal conditions at other electrical devices. In further embodiments, each of the watchers 360, 365, 370 may watch for SIP publish messages to perform at least one of the various functions of the present invention, e.g., issue an alarm to an electrical grid dispatcher, display an abnormal condition on a map to the electrical grid dispatcher, send a notification to a field crew and/or a fault/isolation restoration tool, etc. It should be understood by those of skill in the art that any number of watchers are contemplated by the present invention.

In embodiments, presence infrastructure (e.g., the presence cluster 350) can be only present in the network service provider domain 315, and a watcher (e.g., the utility manager 105) can be present in the utility domain 310. In other words, the utility manager 105 may correspond to a watcher. In this embodiment, the utility manager 105 can subscribe to all presence information updates or events and react as necessary. To transfer information, the domains 310, 315 may include dedicated bandwidth between the two sides. In embodiments, the presence infrastructure can include multiple presence clusters for different types of devices, such as subscriber devices, electrical devices, and watchers.

In embodiments, a third-party watcher can be hosted in a third-party environment, which is completely configurable by a subscriber. Specifically, the subscriber may configure how the environment infrastructure could react to notifications of the critical events or the status information of the electrical devices 110 or the subscriber devices 115, as necessary. The infrastructure may be implemented in the server 12 and/or the computing device 14 in FIG. 1.

FIGS. 4-7 show exemplary flows for performing aspects of the present invention. The steps of FIGS. 4-7 may be implemented in the environments of FIGS. 1-3, for example. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 4:
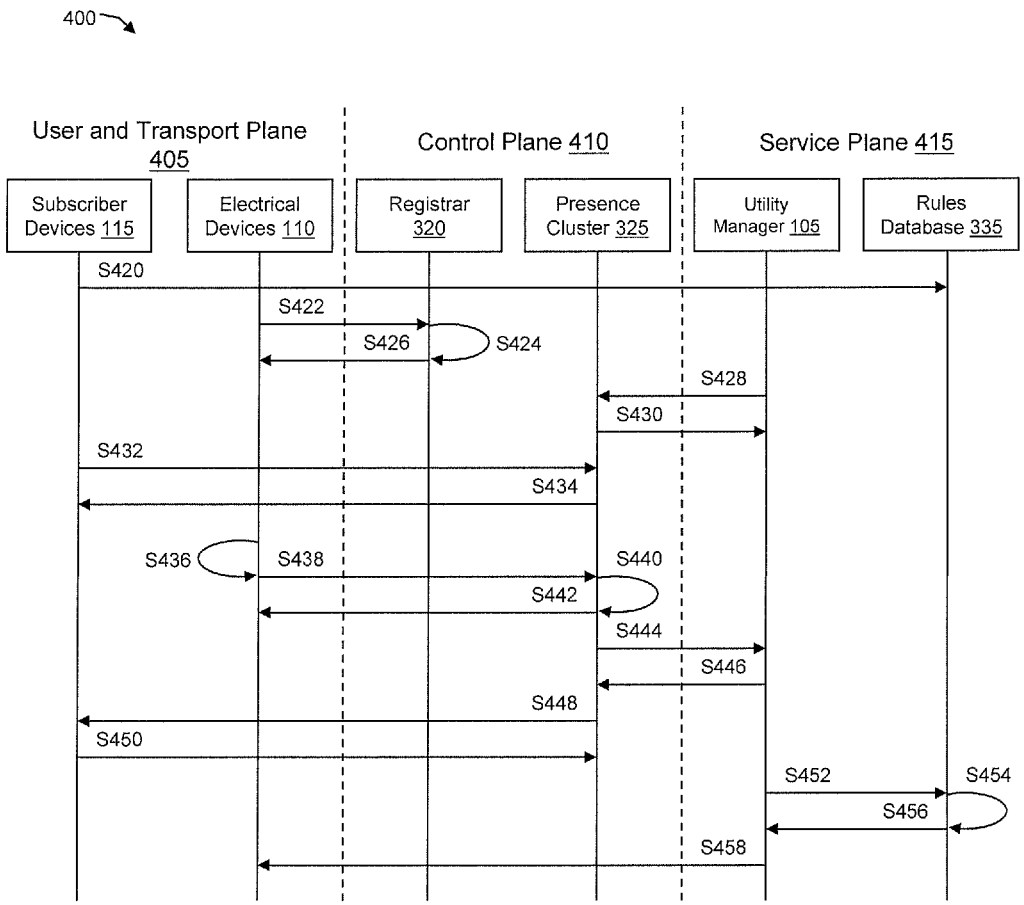
FIG. 4 shows an exemplary flow for detecting and localizing abnormal conditions and electrical faults in an electrical grid in accordance with aspects of the invention.

FIG. 4 depicts an exemplary flow for a process 400 of decentralized and centralized fault isolation and service restoration in an electrical grid in accordance with aspects of the present invention. The process 400 involves three players: a user and transport plane 405, a control plane 410, and a service plane 415. The user and transport plane 405 includes the subscriber devices 115 and the electrical devices 110, e.g. the subscriber devices 115 and the electrical devices 110 in FIGS. 1-2. The control plane 410 includes the registrar 320 and the presence cluster 325, e.g., the S-CSCF/SIP registrar 320 and the presence cluster 325 and/or 350 in FIG. 3. The service plane 415 includes the utility manager 105 and the rules database 335, e.g., one of the watchers 330, 365, 370, 375 and/or the utility manager 105, and the rules database 335 in FIG. 3.

At step S420, the process starts, and at least one of the subscriber devices 115 provisions a set of rules associated with specific event categories and event lists regarding the electrical devices 110. These categories and lists are stored in the rules database 335. The event categories and lists may include actions to take, as and when the events (e.g., abnormal conditions and/or electrical faults) occur. At step S422, at least one of the electrical devices 110 sends a SIP register message via a gateway router (e.g., the load balancing layer 305) to the registrar 320, to register the at least one of the electrical devices 110 and/or the gateway router in the IMS/SIP network.

At step S424, the registrar 320 registers the at least one of the electrical devices 110 and/or the gateway router in the IMS/SIP network using SIP semantics, such as Initial Filter Criteria (iFC). At step S426, the registrar 320 sends a SIP acknowledgment message to the at least one of the electrical devices 110 that indicates that the at least one of the electrical devices 110 has been registered successfully. At step S428, the utility manager 105 sends a SIP subscribe to the presence cluster 325 to subscribe to updates in presence information in the presence cluster 325, such as notifications of critical events or status information at the electrical devices 110. At step S430, the presence cluster 325 sends a SIP acknowledgment message to the utility manager 105 that indicates that the utility manager 105 has subscribed successfully with the presence cluster 325.

At step S432, one or more of the subscriber devices 115 sends a SIP subscribe to the presence cluster 325 to subscribe to updates in presence information in the presence cluster 325, such as notifications of critical events or status information at the electrical devices 110. At step S434, the presence cluster 325 sends a SIP acknowledgment message to the one or more subscriber devices 115 that indicates that the one or more subscriber devices 115 has subscribed successfully with the presence cluster 325. At step S436, at least one of the electrical devices 110 records or observes a critical event or status information (e.g., an abnormal condition and/or an electrical fault) at the at least one of the electrical devices 110. At step S438, the electrical devices 110 sends a SIP notify message including presence information of the critical event or status information at the at least one of the electrical devices 110 to the presence cluster 325.

At step S440, the presence cluster 325 processes the SIP notify message, including building or updating a presence document including the presence information and storing the presence document in a database, e.g., the subscriber/usage database 355 in FIG. 3. At step S442, the presence cluster 325 sends a SIP acknowledgement message to the at least one of the electrical devices 110 that indicates that the presence information has been received and processed. At step S444, the presence cluster 325 cycles through its watcher list and sends a SIP publish message or notification (e.g., a fault detection notification message) to the utility manager 105 that includes the updated presence information. At step S446, the utility manager 105 sends a SIP acknowledgement message to the presence cluster 325 that indicates that the presence information has been received.

At step S448, the presence cluster 325 cycles through its watcher list and sends a SIP publish message or notification (e.g., a fault detection notification message) to the one or more subscriber devices 115 that includes the updated presence information. At step S450, the one or more subscriber devices 115 sends a SIP acknowledgement message to the presence cluster 325 that indicates that the presence information has been received. At step S452, the utility manger 105 requests a rule from the rules database 335 based on the notification of the critical event or status information at the at least one of electrical devices 110. At step S454, the rules database 335 processes the request, specifically, determining actions to take based on the critical event or status information. At step S456, the rules database 335 responds with the rule indicating the actions to take in response to the critical event or status information. At step S458, the utility manager 105 may send a SIP-based command message (e.g., a fault isolation command message or a services restoration command message) to the at least one of the electrical devices 110 based on the rule indicating the actions to take. Alternatively or additionally, the utility manager may perform (initiate) actions necessary to make changes in the at least one of the electrical devices 110, such as issue an alarm and/or display an abnormal condition of the at least one of the electrical devices 110 on a map, for an electrical grid dispatcher to take appropriate actions addressing the abnormal condition. At step S458, the process ends.

Figure 5:
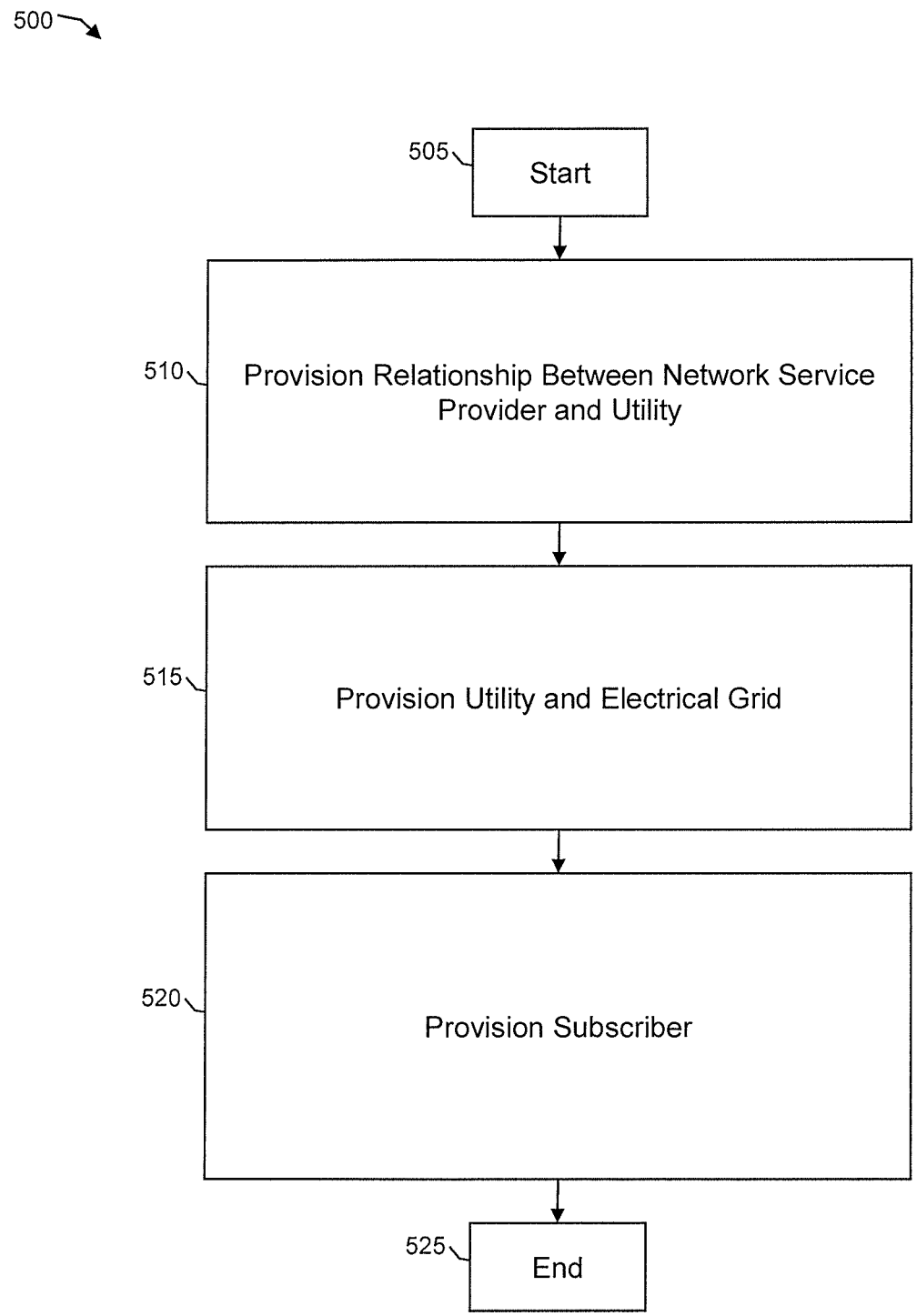
FIG. 5 shows an exemplary flow for provisioning a system for detecting and localizing abnormal conditions and electrical faults in an electrical grid in accordance with aspects of the invention.

FIG. 5 shows an exemplary flow for a process 500 of provisioning a system for detecting and localizing abnormal conditions and electrical faults in an electrical grid in accordance with aspects of the invention. At step S05, the process starts. At step S10, a relationship and connection between a network service provider (e.g., a cellular network service) and a utility provider ("utility") is provisioned. More specifically, a carrier connection agreement between the network service provider and the utility is established, e.g., finalized and agreed upon. The network service provider and the utility provider then establish and test their network domain connectivity, such as peering between presence clusters in their respective domains. In embodiments, a settlement (business) agreement between the network service provider and the utility may be established, e.g., finalized and agreed upon. In addition, the providers may finalize authorization rules of their network domains, or rules on how to connect to their respective network domains, e.g., telecommunication rules and/or SIP registration semantics.

At step S15, an electrical grid of the utility is provisioned. More specifically, at least one electrical device is connected to network domains of the utility and the network service provider. A subscriber (e.g., a field crew) profile is then setup in the network domains and in a rules database. In embodiments, the utility may test the connectivity of the electrical device with the electrical grid and the network domains. In addition, the utility may notify the subscriber of the connection of the electrical device to the electrical grid.

At step S20, a subscriber is provisioned to the network of the invention. More specifically, the subscriber subscribes to a device information (e.g., status information of the electrical device) and a fault detection service operated by the utility and/or network service provider. In embodiments, the subscriber may include, for example, the utility manager 105 and the subscriber device in 115 in FIGS. 1-2, the watchers 330, 365, 370, 375 in FIG. 3, etc. The subscriber then configures the subscriber network device (e.g., a mobile device) for use in the service of the present invention. In embodiments, the subscriber may test the configured network device using the service. In addition, through the network device, the subscriber may configure critical electrical events at the electrical device and other energy control rules, by communicating with a rules database in the network domain of the utility. The subscriber may also communicate with the presence clusters at the network domains of the utility and/or the network service provider to receive and possibly react to notifications of the critical events at the electrical device. At step S25, the process ends.

Figure 6:
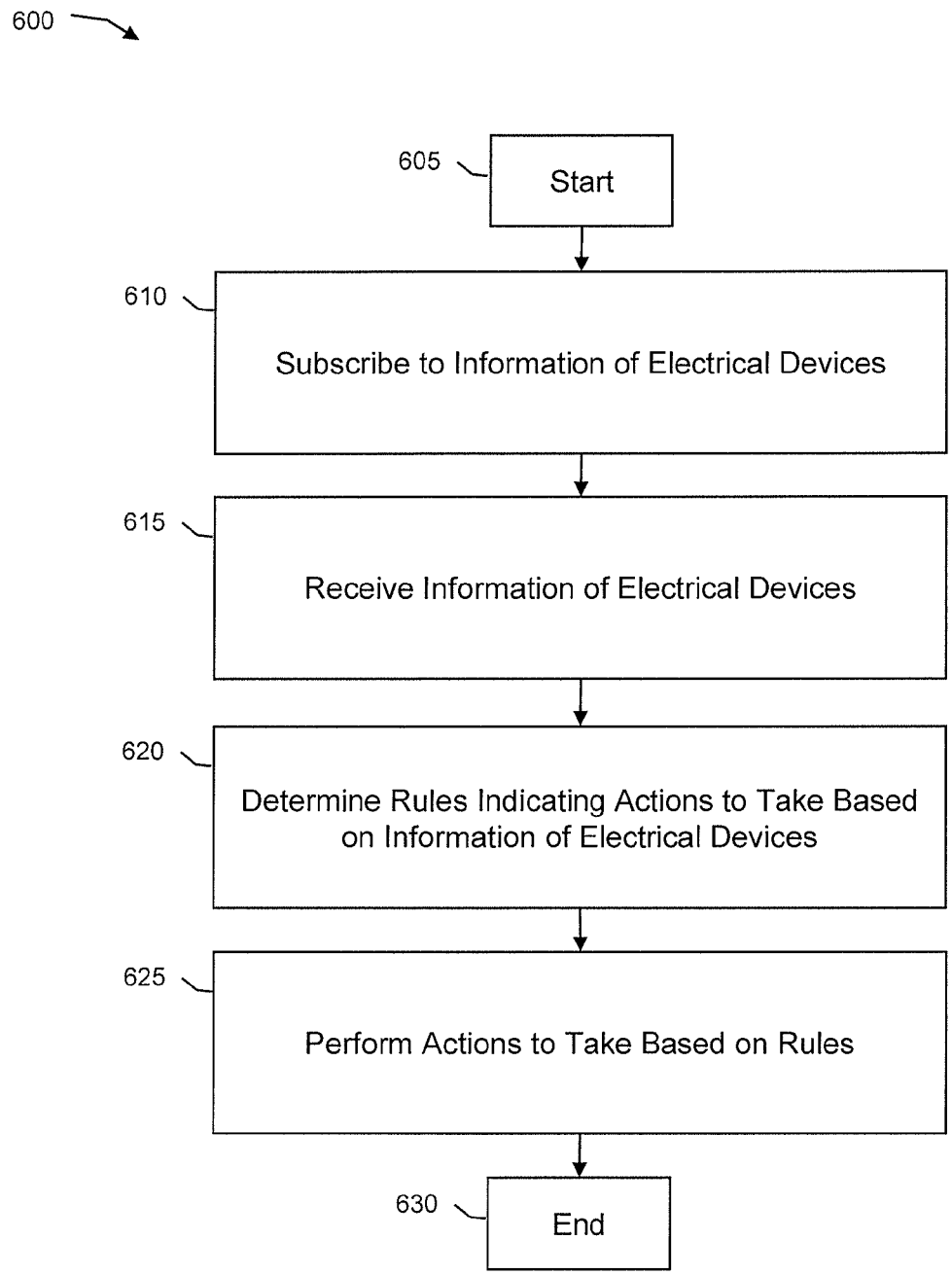
FIGS. 6-7 show additional exemplary flows for detecting and localizing abnormal conditions and electrical faults in an electrical grid in accordance with aspects of the invention.

FIG. 6 depicts another exemplary flow for a process 600 for detecting and localizing abnormal conditions and electrical faults in an electrical grid in accordance with aspects of the present invention. In embodiments, the process 600 may be performed by the utility manager 105 in FIGS. 1-3. At step 605, the process starts. At step 610, the utility manager subscribes to notifications of critical events or status information at one or more electrical devices (e.g., one of the electrical devices 110 in FIGS. 1-2), such as through sending a SIP subscribe message to a presence cluster. At step 615, the utility manager receives the notifications of the critical events or status information (e.g., an abnormal condition) at the electric devices, such as via receiving a SIP publish message. At step 620, the utility manager determines a rule from a rules database (e.g., the rules database 335 in FIG. 3) based on the notification of the critical event or status information at the electrical devices. At step 625, the utility manager either sends a command message to the electrical devices based on the rule indicating the actions to take, or performs (initiates) actions necessary to make changes in the electrical devices, such as issue an alarm to an electrical grid dispatcher of the electricity supplier that indicates that the critical event has been detected at the electrical devices. At step 630, the process ends.

Figure 7:
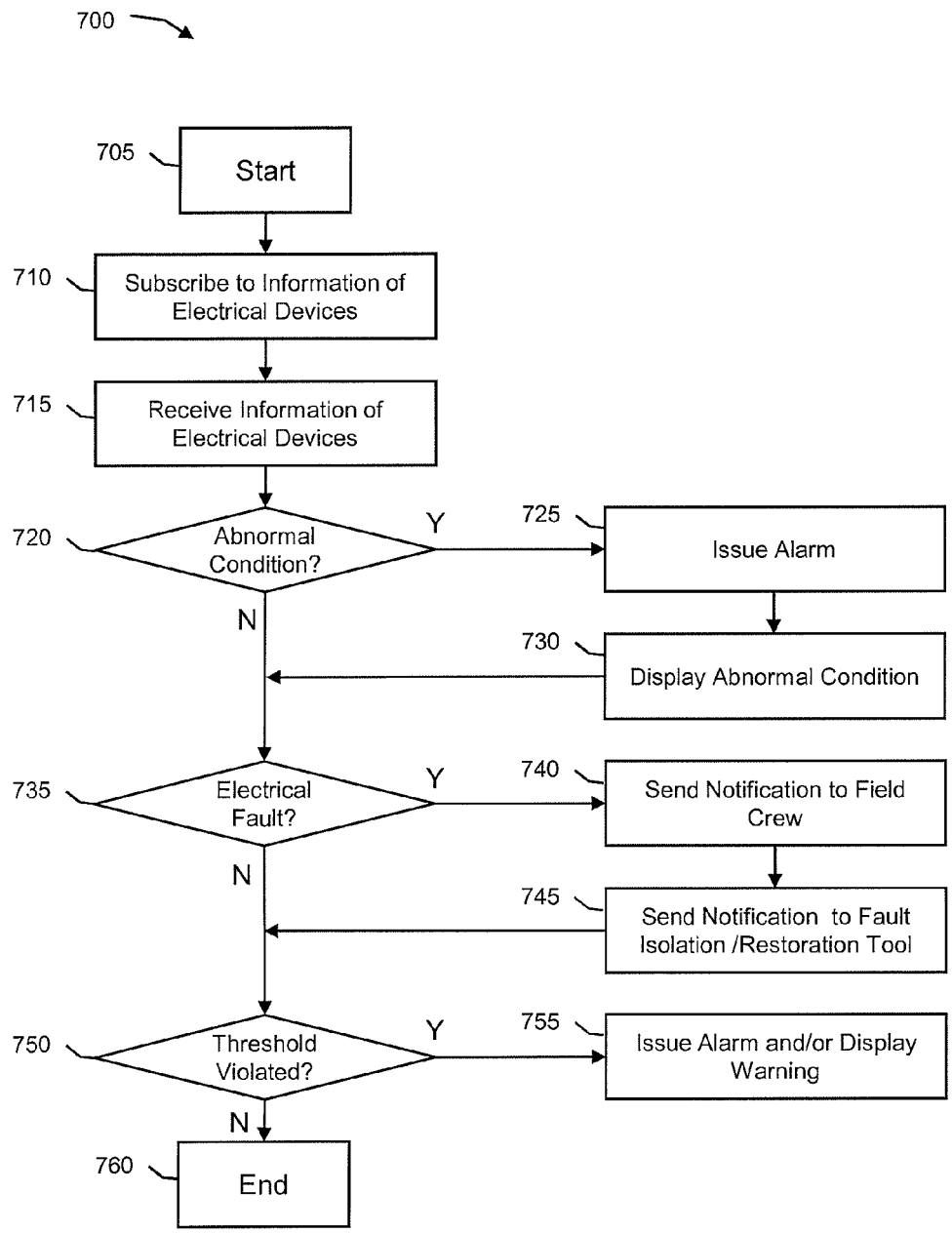

FIG. 7 depicts another exemplary flow for a process 700 for detecting and localizing abnormal conditions and electrical faults in an electrical grid in accordance with aspects of the present invention. In embodiments, the process 700 may be performed by the utility manager 105 in FIGS. 1-3. At step 705, the process starts. At step 710, the utility manager subscribes to notifications of critical events or status information at one or more electrical devices (e.g., the electrical devices 110 in FIGS. 1-2), such as through sending a SIP subscribe message to a presence cluster. At step 715, the utility manager receives the notifications of the critical events or status information (e.g., an electrical fault) at the electric devices, such as via receiving a SIP publish message.

At step 720, the utility manager determines whether an abnormal condition (e.g., an indication that a voltage at one of the electrical devices is greater or less than a predetermined threshold) has been detected at the electrical devices, based on the received notifications or status information. If the abnormal condition has been detected, the process continues at step 725. Otherwise, the process continues at step 735. At step 725, the utility manager issues an alarm message to a SCADA system that indicates that the abnormal condition has been detected. In embodiments, the issuing of the alarm message may include displaying the alarm message on an alarm display of the SCADA system (e.g., the alarm display 117 of the I/O device 28 in FIG. 1) such that a system operator (e.g., an electrical grid dispatcher) may detect the alarm message and take one or more appropriate actions addressing the abnormal condition, e.g., command the electrical device to shut off and isolate the abnormal condition, etc. At step 730, the utility manager displays the abnormal condition onto one or more electrical grid displays of the SCADA system, e.g., the electrical grid displays 119 of the I/O device 28. In embodiments, the abnormal condition may be displayed onto a geo-spatial (e.g., map-like), schematic (e.g., more-detailed, diagram), and/or tabular view of the electrical grid displays such that the dispatcher can localize the abnormal condition.

At step 735, the utility manager determines whether an electrical fault has been detected at the electrical devices, based on the received notifications or status information. If the electrical fault has been detected, the process continues at step 740. Otherwise, the process continues at step 750. At step 740, the utility manager sends or forwards a SIP-based notification message to a subscriber device (e.g., one of the subscriber devices 115) of a field crew close to a location of the faulted electrical device. In embodiments, the notification message received at the subscriber device may include, for example, a map depicting a location of the electrical device, along with information associated with the electrical fault, e.g., instructions on how to isolate the electrical fault. At step 745, the utility manager sends or forward a SIP-based notification message to, e.g., a fault isolation and restoration tool (e.g., the fault isolation and restoration tool 260 in FIG. 2) of the utility, e.g., the electricity supplier. In response to the notification message, the fault isolation and restoration tool evaluates an extent of the electrical fault, a blackout area, and/or an instable section of the electrical grid, and identifies (automatically or manually) switching steps to isolate the electrical fault. Later, when the electrical fault has been isolated and/or remedied, the fault isolation and restoration tool may send SIP-based command messages to the electrical devices that instruct them to resume generating and/or transmitting electricity and to restore power to consumers.

At step 750, the utility manager determines whether an electrical threshold (e.g., a current or voltage threshold) at the electrical devices is about to be violated or exceeded, based on the received notifications or status information. If the electrical threshold is about to be violated, the process continues at step 755. Otherwise, the process continues at step 760. At step 755, the utility manager issues a SIP-based alarm or warning message to be displayed on the SCADA system and to the SCADA system operator (e.g., the electrical grid dispatcher) responsible for a particular area where the electrical threshold is about to be violated. Alternatively or additionally, the utility manager may display the warning message on a geo-spatial, schematic, or tabular view of the electrical grid, e.g., display a color on an area of a map that indicates the area of the electrical grid where the electrical threshold may be violated. Such a displayed warning message provides the electrical grid dispatcher with the necessary information to decide whether to reconfigure electrical devices to avoid violating the electrical threshold of the electrical devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed is:

1. A method, comprising:
   receiving a notification message comprising a state of an electrical component on an electrical grid;
   determining at least one rule indicating at least one action to take based on the notification message; and
   performing or initiating the at least one action indicated by the at least one rule,
   wherein the performing or initiating the at least one action comprises displaying, by a computing system, an alarm message indicating the state of the electrical component to a system operator responsible for the electrical component such that system operator is able to determine the at least one action to take in response to the state of the electrical component.

2. The method of claim 1, wherein the state of the electrical component comprises at least one of an abnormal condition and an electrical fault detected at the electrical component.

3. The method of claim 2, wherein the abnormal condition detected at the electrical component comprises at least one of:
   a voltage at the electrical component being greater or less than a predetermined threshold;
   a frequency at the electrical component being greater or less than a predetermined threshold;
   a current at the electrical component being greater or less than a predetermined threshold;
   a short circuit detected at the electrical component; and
   the electrical component being closed when the electrical component is to be opened, or being open when the electrical component is to be closed.

4. The method of claim 1, wherein the computing system comprises a Supervisory Control and Data Acquisition (SCADA) system.

5. The method of claim 4, wherein the SCADA system displays the state of the electrical component on an alarm display of the SCADA system, comprising one or more alarms indicating one or more states of electrical components on the electrical grid.

6. The method of claim 4, wherein the SCADA system displays the state of the electrical component on one or more electrical grid displays of the SCADA system, comprising at least one of a geo-spatial view, a schematic view, and a tabular view of an area of the electrical grid.

7. A method, comprising:
   receiving a notification message comprising a state of an electrical component on an electrical grid;
   displaying, by a computing system, an alarm message indicating the state of the electrical component to a system operator responsible for the electrical component such that system operator is able to determine the at least one action to take in response to the state of the electrical component; and
   sending the notification message to a device of a field crew, the notification message comprising a map depicting a location of the electrical component, and instructions on how to respond to the state of the electrical component.

8. The method of claim 1, further comprising sending the notification message to a fault isolation and restoration tool operable to evaluate the state of the electrical component and at least one isolate the electrical component and restore electricity service at the electrical component.

9. The method of claim 1, further comprising, when the state of the electrical component comprises an indication that an electrical threshold is about to be violated, at least one of:
   displaying the state of the electrical component on an alarm display of a SCADA system, comprising one or more alarms indicating one or more states of electrical components on the electrical grid; and
   displaying the state of the electrical component on one or more electrical grid displays of the SCADA system, comprising at least one of a geo-spatial view, a schematic view, and a tabular view of an area of the electrical grid.

10. The method of claim 1, wherein a service provider at least one of creates, maintains, deploys and supports a computer infrastructure operable to perform the steps of claim 1.

11. The method of claim 1, wherein the steps of claim 1 are provided by a service provider on a subscription, advertising, and/or fee basis.

12. A system implemented in hardware, comprising:
   a computer infrastructure operable to:
      receive a notification message of an electrical device on an electrical grid, the notification message including a status of the electrical device;
      determine at least one rule indicating at least one action to take based on the status of the electrical device; and
      perform the at least one action indicated by the at least one rule,
      wherein the at least one action comprises displaying the status of the electrical device on one or more electrical grid displays comprising at least one of a geo-spatial view, a schematic view, and a tabular view of an area of the electrical grid, for a system operator responsible for the electrical device such that the system operator is able to determine a command action for at least one of the electrical device and other electrical devices in response to the status of the electrical device.

13. The system of claim 12, wherein the state of the electrical device comprises at least one of an abnormal condition and an electrical fault detected at the electrical device.

14. The system of claim 13, wherein the abnormal condition detected at the electrical device comprises at least one of:
a voltage at the electrical device being greater or less than a predetermined threshold;
a frequency at the electrical device being greater or less than a predetermined threshold;
a current at the electrical device being greater or less than a predetermined threshold;
a short circuit detected at the electrical device; and
the electrical device being closed when the electrical device is to be opened, or being open when the electrical device is to be closed.

15. The system of claim 12, wherein the computer infrastructure comprises a Supervisory Control and Data Acquisition (SCADA) system.

16. The system of claim 15, wherein the SCADA system displays the status of the electrical device on an alarm display of the SCADA system, comprising one or more alarms indicating one or more states of electrical devices on the electrical grid.

17. The system of claim 12, wherein the computer infrastructure is at a back end, centralized premise of a utility, the back end, centralized premise comprising at least one of a utility control center, a distribution, transmission, and generation control center, and an Independent System Operator (ISO)/Regional Transmission Organization (RTO) grid control center.

18. The system of claim 12, wherein the computer infrastructure is further operable to send the notification message to a device of a field crew, the notification message comprising a map depicting a location of the electrical device, and instructions on how to responds to the status of the electrical device.

19. The system of claim 12, wherein the computer infrastructure is further operable to send the notification message to a fault isolation and restoration tool operable to evaluate the status of the electrical device and at least one isolate the electrical device and restore electricity service at the electrical device.

20. The system of claim 12, wherein the computer infrastructure is further operable to, when the status of the electrical device comprises an indication that an electrical threshold is about to be violated, at least one of:
display the status of the electrical device on an alarm display of a SCADA system, comprising one or more alarms indicating one or more states of electrical devices on the electrical grid; and
display the status of the electrical device on the one or more electrical grid displays of the SCADA system, comprising at least one of the geo-spatial view, the schematic view, and the tabular view of the area of the electrical grid.

21. A computer program product comprising a computer usable storage medium having readable program code embodied in the storage medium, the computer program product comprises at least one component operable to:
subscribe to receive a state of an electrical component on an electrical grid;
receive a notification message comprising the state of the electrical component on the electrical grid; and
determine at least one rule indicating at least one action to take based on the notification message; and
perform or initiate the at least one action indicated by the at least one rule,
wherein the performing or initiating at least one action comprises displaying an alarm message indicating the state of the electrical component to a system operator responsible for the electrical component such that system operator is able to determine the at least one action to take in response to the state of the electrical component.

22. The computer program product of claim 21, wherein the state of the electrical component comprises at least one of an abnormal condition and an electrical fault detected at the electrical component.

23. A method for detecting and localizing abnormal conditions and electrical faults in an electrical grid, comprising:
providing a computer infrastructure, being operable to:
send a register session initiation protocol (SIP) message to register in a network;
record an electrical event at a location on the electrical grid;
send a SIP notification message comprising presence information of the electrical event, through the network to a Supervisory Control and Data Acquisition (SCADA) system operable to display the presence information on an alarm display of the SCADA system, comprising one or more alarms indicating one or more states of electrical components on the electrical grid.

24. The method of claim 23, wherein the electrical event comprises one of an abnormal condition and an electrical fault at the location.

25. A computer system for detecting and localizing abnormal conditions and electrical faults in an electrical grid, the system comprising:
a CPU, a computer readable memory and a computer readable storage media;
first program instructions to receive a notification message comprising a state of an electrical component on the electrical grid;
second program instructions to determine at least one rule indicating at least one action to take based on the notification message;
third program instructions to perform the at least one action indicated by the at least one rule,
wherein the at least one action comprises displaying the state of the electrical component on an alarm display of a Supervisory Control and Data Acquisition (SCADA) system, comprising one or more alarms indicating one or more states of electrical components on the electrical grid; and
fourth program instructions to display the state of the electrical component on one or more electrical grid displays of the SCADA system, comprising at least one of a geo-spatial view, a schematic view, and a tabular view of an area of the electrical grid,
wherein the state of the electrical component comprises at least one of an abnormal condition and an electrical fault detected at the electrical component, and wherein the first, second, third, and fourth program instructions are stored on the computer readable storage media for execution by the CPU via the computer readable memory.

* * * * *